(12) United States Patent
Yamagishi

(10) Patent No.: US 10,781,836 B2
(45) Date of Patent: Sep. 22, 2020

(54) JOINT STRUCTURE AND METHOD OF MANUFACTURING JOINT STRUCTURE

(71) Applicant: FUJIKURA LTD., Tokyo (JP)

(72) Inventor: Hiroyuki Yamagishi, Tokyo (JP)

(73) Assignee: FUJIKURA, LTD., Tokyo (JP)

( * ) Notice: Subject to any disclaimer, the term of this patent is extended or adjusted under 35 U.S.C. 154(b) by 329 days.

(21) Appl. No.: 15/719,917

(22) Filed: Sep. 29, 2017

(65) Prior Publication Data

US 2018/0093345 A1 Apr. 5, 2018

(30) Foreign Application Priority Data

Sep. 30, 2016 (JP) .................. 2016-194254

(51) Int. Cl.
| | |
|---|---|
| *F16B 5/08* | (2006.01) |
| *B23K 26/20* | (2014.01) |
| *B23K 26/244* | (2014.01) |
| *B23K 26/24* | (2014.01) |

(52) U.S. Cl.
CPC .............. *F16B 5/08* (2013.01); *B23K 26/206* (2013.01); *B23K 26/244* (2015.10)

(58) Field of Classification Search
CPC .. B23K 26/206; B23K 26/244; B23K 26/436; B23K 26/57; B29C 65/16; B29L 2031/24; F16B 5/08; Y10T 403/477
USPC ....................................................... 403/270
See application file for complete search history.

(56) References Cited

U.S. PATENT DOCUMENTS

| | | | | |
|---|---|---|---|---|
| 6,974,207 | B2* | 12/2005 | Drummond | ......... B29C 65/1635 347/49 |
| 8,357,875 | B2* | 1/2013 | Ehrmann | ............ B29C 65/1635 219/121.63 |
| 8,395,981 | B2* | 3/2013 | Arai | ........................ G11B 7/22 359/811 |
| 2004/0239007 | A1 | 12/2004 | Aria et al. | |
| 2006/0219624 | A1* | 10/2006 | Kuno | ..................... B01D 29/01 210/435 |
| 2011/0036817 | A1 | 2/2011 | Ehrmann et al. | |

(Continued)

FOREIGN PATENT DOCUMENTS

| | | |
|---|---|---|
| CN | 104364620 A | 2/2015 |
| DE | 102009037404 A1 | 2/2011 |
| JP | S62-142092 A | 6/1987 |

(Continued)

OTHER PUBLICATIONS

Office Action for related CN App No. 201710905042.3 dated Jun. 21, 2019, 9 pgs.

(Continued)

*Primary Examiner* — Josh Skroupa
(74) *Attorney, Agent, or Firm* — Procopio, Cory, Hargreaves & Savitch LLP

(57) ABSTRACT

A joint structure comprises a light-absorbable member having at least one opening portion and a light-permeable member superposed on the light-absorbable member so as to cover the opening portion, wherein a first annular weld part is formed so as to enclose the opening portion and join the light-absorbable member and the light-permeable member, and a second dot-like weld part(s) joining the light-absorbable member and the light-permeable member is/are formed in a position adjacent to the first weld part.

6 Claims, 11 Drawing Sheets

(56) References Cited

U.S. PATENT DOCUMENTS

2015/0192446 A1  7/2015  Aria et al.

FOREIGN PATENT DOCUMENTS

| JP | H11-297286 A | 10/1999 |
| JP | 2004358697 A | 12/2004 |
| JP | 2010005913 A1 | 1/2010 |
| WO | 2010035696 A1 | 4/2010 |
| WO | 2013186926 A1 | 12/2013 |

OTHER PUBLICATIONS

Japanese Office Action dated Jan. 16, 2019 for Application No. 2016-194254 (6 pages).

* cited by examiner

FIG. 2A
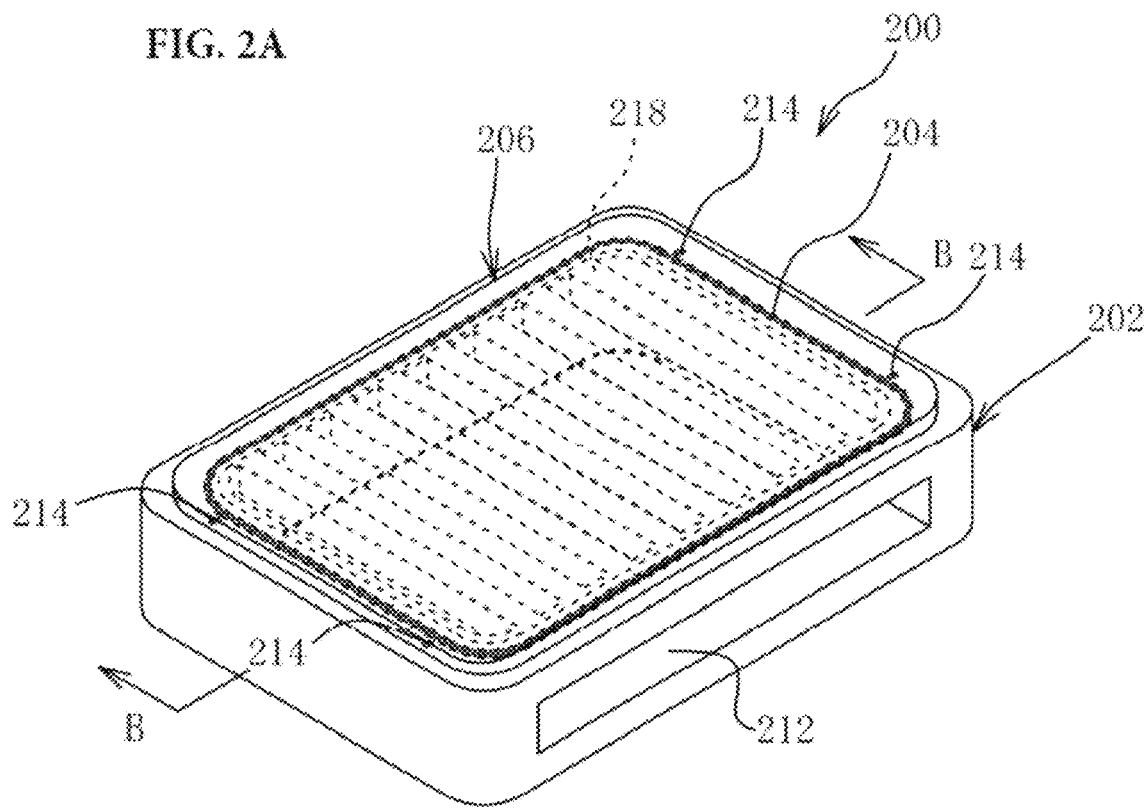
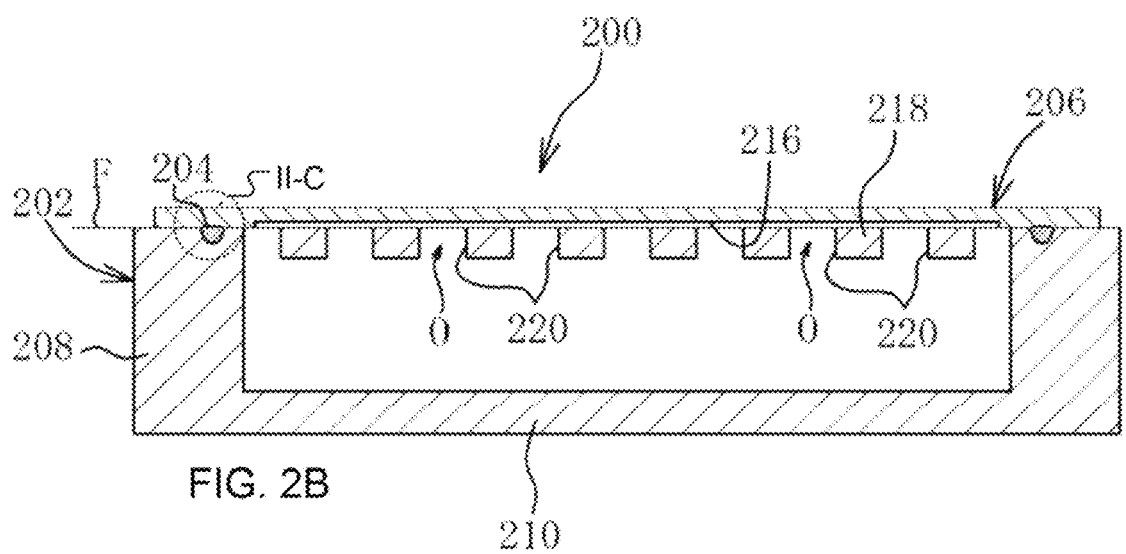
FIG. 2B
FIG. 2C
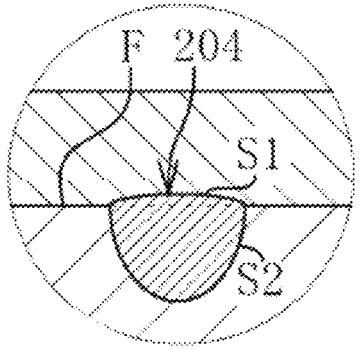

JOINT STRUCTURE AND METHOD OF MANUFACTURING JOINT STRUCTURE

This application claims priority to Japanese Patent Application No. 2016-194254, filed on Sep. 30, 2016, the contents of which is incorporated herein by reference in its entirety.

TECHNICAL FIELD

This invention relates to a joint structure comprising a light-absorbable member and a light-permeable member superposed to each other and joined to each other through a weld part(s) formed in a boundary face or in the neighborhood of the boundary face and a method for manufacturing the joint structure.

RELATED ART

As a method for joining plural members has hitherto been known a joining method through laser beam irradiation. In recent years is noticed a laser transmission welding method in which heating is local and thermal damage to a product is small and an influence of a weld part on an appearance is small. This method is a method wherein a member having a permeability to a laser beam (light-permeable member) is used as a joining member and a member having an absorbability to a laser beam (light-absorbable member) is used as the other joining member and these members are superposed to each other and exposed to a laser beam from the light-permeable member at a pressurized state, whereby energy of the irradiated laser beam is absorbed by the light-absorbable member in the neighborhood of a boundary face thereof to cause heat generation, and the generated heat is transferred to the light-permeable member to fuse the both members, and finally the fused portions are cooled and solidified to join the both members to each other.

The laser transmission welding method has some important points. Among them, it is especially important that the members to be joined are surely adhered to each other by pressurization. If a gap is existent between the members to be joined, heat generated in the light-absorbable member by the laser beam irradiation is not well transferred to the light-permeable member, and hence poor welding such as upheaving, expanding, explosion or the like is caused by local temperature rising.

In general, the pressurization is attained by a method wherein a glass plate having a permeability to a laser beam is disposed onto the light-permeable member and a pressure is applied to the both members through the glass plate (see Patent Document 1). However, this method has a problem that the glass plate is contaminated with soot generated in the heating and fusion of the members to be joined or a vaporization ingredient of a flame retardant to increase an absorption rate of the glass plate to the laser beam and hence the glass plate itself is heated to cause breakage. Also, the laser beam is shielded by the contaminated glass plate so as not to reach to the light-absorbable member sufficiently and hence the decrease of welding strength is caused.

On the other hand, Patent Document 2 proposes a method of adhering the members to be joined to each other by sucking without using the glass plate. In the method of Patent Document 2, a groove portion is formed in one of the members to be joined and the both members are adhered to each other by depressurizing a space of the groove portion. In the welding through laser beam irradiation, however, thermal deformation is caused in one or both of the members to be joined or warping is caused in the members to be joined during the forming, and hence a gap is generated between the members to be joined to decrease an adhesiveness by sucking.

PATENT DOCUMENTS

Patent Document 1: JP-A-S62-142092
Patent Document 2: WO2010-035696

SUMMARY OF THE INVENTION

It is, therefore, an object of the invention to provide a joint structure suitable for uniformly and surely adhering members to be joined to each other without using a glass plate and to provide a method of manufacturing a joint structure which is capable of uniformly and surely adhering members to be joined to each other without using a glass plate.

In order to solve the above problems, the invention provides a joint structure comprising a light-absorbable member having at least one opening portion and a light-permeable member superposed on the light-absorbable member so as to cover the opening portion, wherein a first annular weld part is formed so as to enclose the opening portion and join the light-absorbable member and the light-permeable member, and a second dot-like weld part(s) joining the light-absorbable member and the light-permeable member is/are formed in a position adjacent to the first weld part.

In the joint structure according to the invention, the light-permeable member is preferable to be formed into a thin sheet adhering to the light-absorbable member by deforming at a depressurized state of an interior of the opening portion before the formation of the first weld part.

It is preferable that the light-permeable member is rendered into a thickness adhering to the light-absorbable member by deforming when the interior of the opening portion is depressurized to not less than −80 kPa but not more than −20 kPa as a gauge pressure before the formation of the first weld part.

Alternatively, the light-permeable member is preferable to be provided outside the first weld part with a thinned piece adhering to the light-absorbable member by deforming at a depressurized state of an interior of the opening portion before the formation of the first weld part.

In this case, it is preferable that the thinned piece is formed in a thickness adhering to the light-absorbable member by deforming when the interior of the opening portion is depressurized to not less than −80 kPa but not more than −20 kPa as a gauge pressure before the formation of the first weld part.

Furthermore, the thinned piece is preferable to be formed along a peripheral edge part of the light-absorbable member.

In order to solve the above problems, the invention is a method of manufacturing a joint structure which comprises superposing a light-permeable member onto a light-absorbable member having at least one opening portion so as to cover the opening portion, irradiating a laser beam from the side of the light-permeable member to form a first annular weld part so as to enclose the opening portion to thereby join the light-absorbable member and the light-permeable member, wherein a second dot-like weld part(s) joining the light-absorbable member and the light-permeable member is formed in a position adjacent to the predetermined site of forming the first weld part after the superposition of the light-permeable member onto the light-absorbable member and before the formation of the first weld part.

In the method of manufacturing the joint structure according to the invention, the light-permeable member is formed into a thin sheet adhering to the light-absorbable member by deforming at a state of depressurizing an interior of the opening portion before the formation of the first weld part and the interior of the opening portion is depressurized in the formation of the first weld part to deform the light-permeable member and the laser beam is irradiated from the side of the light-permeable member at a state of adhering to the light-absorbable member.

In this case, it is preferable that the light-permeable member is formed in a thickness adhering to the light-absorbable member by deforming when the interior of the opening portion is depressurized to not less than −80 kPa but not more than −20 kPa as a gauge pressure before the formation of the first weld part.

Alternatively, a thinned piece of the light-permeable member adhering to the light-absorbable member is formed outside the first weld part by deforming at a state of depressurizing an interior of the opening portion before the formation of the first weld part, and the interior of the opening portion is depressurized in the formation of the first weld part to deform the thinned piece and the laser beam is irradiated from the side of the light-permeable member at a state of adhering to the light-absorbable member.

In this case, it is preferable that the thinned piece is formed in a thickness adhering to the light-absorbable member by deforming when the interior of the opening portion is depressurized to not less than −80 kPa but not more than −20 kPa as a gauge pressure before the formation of the first weld part.

Also, the thinned piece is preferable to be formed along a peripheral edge part of the light-absorbable member.

In the method manufacturing of the joint structure according to the invention, it is preferable that a suction port communicating with the opening portion and connecting to an external depressurizing device is formed in the light-absorbable member.

In the method of manufacturing the joint structure according to the invention, it is preferable that the suction port is fused and closed by irradiating a laser beam from the side of the light-permeable member after the formation of the first weld part while keeping the depressurized state in the opening portion.

In the method of manufacturing the joint structure according to the invention, it is preferable that the interior of the opening portion is depressurized while feeding a purge gas to the interior of the opening portion.

In this case, the depressurization of the interior of the opening portion and the feed of the purge gas are conducted with a double pipe through the suction port.

In the method of manufacturing the joint structure according to the invention, it is preferable that an airtightness test of the first weld part is performed by measuring a change of a pressure per unit time when the interior of the opening portion is kept at the depressurized state subsequent to the formation of the annular weld part or the interior of the opening portion is pressurized or the depressurization and pressurization are performed alternately.

In the method of manufacturing the joint structure according to the invention, it is preferable that the judgement on adhesion between the light-absorbable member and the light-permeable member, start of the formation of the first weld part and end of the formation of the first weld part is performed based on a change of a pressure obtained by always detecting a pressure inside the opening portion.

In the manufacture of the joint structure according to the invention, the light-absorbable member and the light-permeable member are previously joined to each other by the dot-like weld parts to correct warping resulting from the shaping of the light-permeable member and suppress thermal deformation of the light-permeable member in the subsequent formation of the annular weld part being large in the thermal influence, so that an excellent adhesiveness between the light-absorbable member and the light-permeable member by suction can be maintained.

According to the invention, therefore, the joint structure suitable for uniformly and surely adhering the members to be joined to each other can be provided without using a glass plate, and also there can be provided the method of manufacturing the joint structure which is capable of uniformly and surely adhering the members to be joined to each other without using a glass plate.

BRIEF DESCRIPTION OF THE DRAWINGS

FIG. 2A is a perspective view of another embodiment of the joint structure according to the invention and FIG. 2B is a section view taken along a line B-B in FIG. 2A. FIG. 2C is enlarged view of region II-C in FIG. 2B.

EMBODIMENTS FOR CARRYING OUT THE INVENTION

Figure 1A:
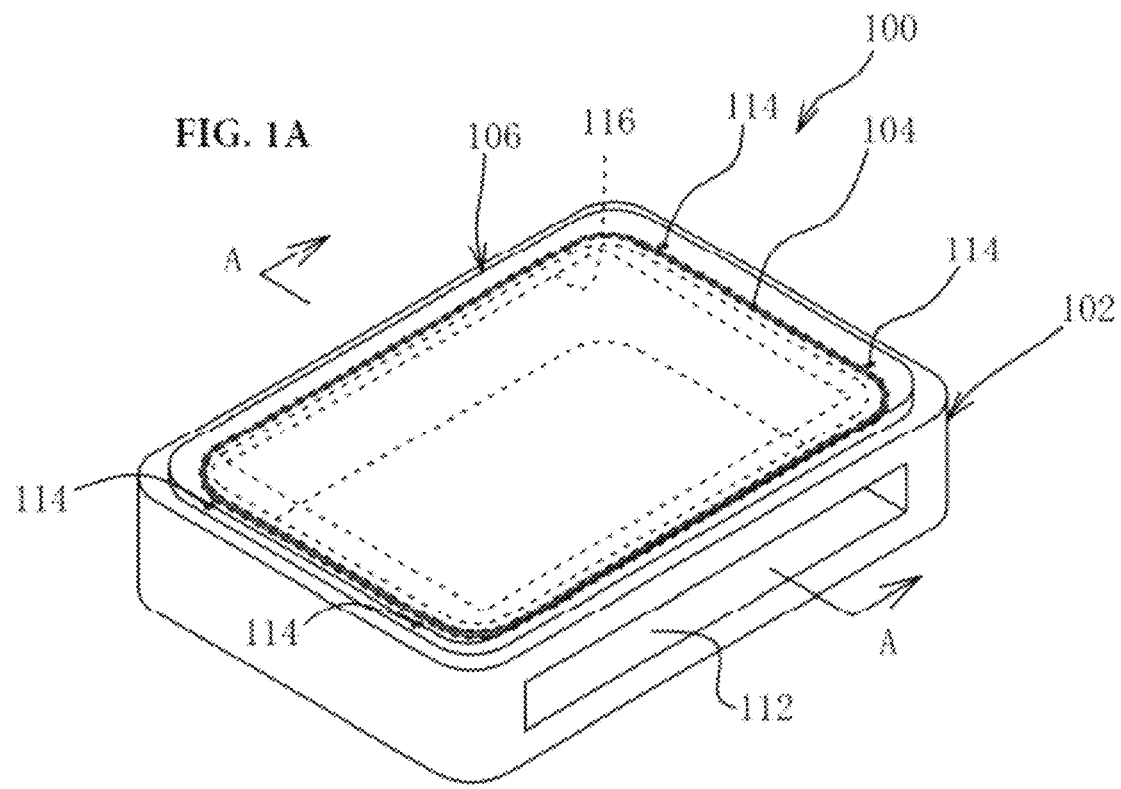
FIG. 1A is a perspective view of an embodiment of the joint structure according to the invention and FIG. 1B is a section view taken along a line A-A in FIG. 1A.

An embodiment of the invention will be described with reference to the drawings below. Moreover, similar members and portions shown in the drawings are represented by symbols added with a symbol "100" or "200", and an explanation on overlapping portions is omitted.

Figure 1B:
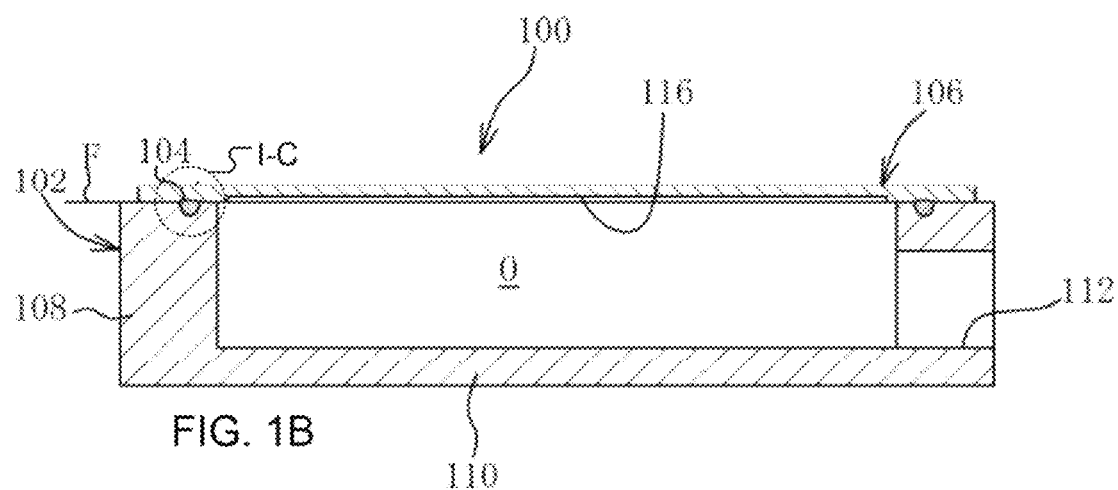
Figure 1C:
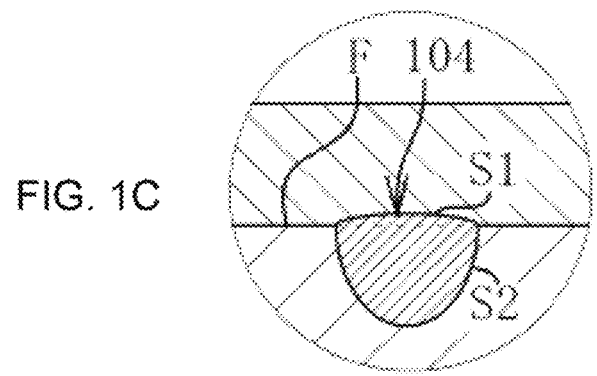
FIG. 1C is enlarged view of region I-C in FIG. 1B.

FIGS. 1A, 1B, and 1C show an embodiment of the joint structure 100 according to the invention, in which FIG. 1A is a perspective view and FIG. 1B is a section view taken along a line A-A in FIG. 1A and FIG. 1C is enlarged view of region I-C in FIG. 1B. As shown in this figure, the joint structure 100 comprises a light-absorbable member 102 having an opening portion O and a light-permeable member 106 superposed with the light-absorbable member 102 so as to cover the opening portion O and joined to the light-absorbable member 102 through a first annular weld part 104 enclosing the opening portion O. Moreover, the term "annular" means not only a circular form such as a ring but also a continuously closed form (endless form). Therefore, the annular form includes not only a circle and an ellipsoid but also a rectangle, a polygon and other closed forms. The first weld part 104 is formed on a boundary face F between the light-permeable member 106 and the light-absorbable member 102. As mentioned in detail later, the first weld part 104 can be formed by irradiating a laser beam from the side of the light-permeable member 106 toward the light-absorbable member 102 to cause heat generation, fusing the light-absorbable member 102 as well as the light-permeable member 106 by the generated heat and solidifying the fused portions.

The light-absorbable member 102 has an absorption rate to a laser beam higher than that of the light-permeable member 106 and is composed mainly of a thermoplastic resin or a thermoplastic elastomer, which can be shaped by an injection molding or the like. It is preferable to have an absorption rate of not less than 10% to a laser beam selected from laser beams having a center of oscillation wavelength within a range of 193-10600 nm. As a laser are included, for example, a carbon dioxide laser (wavelength: about 10600 nm), Nd-YAG laser (wavelength: about 1064 nm), a green laser being a secondary harmonic of $Nd-YVO_4$ laser (wavelength: about 532 nm), a diode laser (wavelength: about 800 nm, 840 nm or 950 nm), an excimer laser (wavelength: about 193 nm) and so on. In order to adjust the absorption rate of the light-absorbable member 102, a black coloring agent such as carbon black or the like, a pigment, a dyestuff and so on may be kneaded with the thermoplastic resin or a thermoplastic elastomer.

As the thermoplastic resin are included, for example, polyamide resin, polyethylene resin, polypropylene resin, polyethylene terephthalate resin, polybutylene terephthalate resin, polyphenyl ether resin, polystyrene resin, high-impact polystyrene resin, hydrogenated polystyrene resin, polyacryl styrene resin, ABS resin, AS resin, AES resin, ASA resin, SMA resin, polyalkyl methacrylate resin, polymethyl methacrylate resin, polycarbonate resin, polyester resin, polyphenylene sulfide, liquid crystal polymer and so on. As the thermoplastic elastomer are included, for example, styrene-based thermoplastic elastomer, olefinic thermoplastic elastomer, polyester-based thermoplastic elastomer, polyurethane-based thermoplastic elastomer, PVC-based thermoplastic elastomer and so on. The thermoplastic resin may be kneaded with glass fibers, minerals and the like as a reinforcing material.

In the illustrated example, the light-absorbable member 102 is mainly comprised of a peripheral wall 108 defining an opening portion O and a bottom wall 110 closing the lower end part of the peripheral wall 108. The cross-sectional shape of the peripheral wall 108 is substantially rectangular, but is not limited thereto and may take any shape such as circular, ellipsoidal, trapezoidal, polygonal, gourd-shaped and the like. In the peripheral wall 108 is formed a suction port 112 communicating with the opening portion O so as to depressurize an interior of the opening portion O as mentioned later. The suction port 112 may be formed in the bottom wall 110 or a lower end of the peripheral wall 108 is opened without forming in the bottom wall 110 and the opened port in the lower end is used as the suction port 112.

The light-permeable member 106 has an absorption rate to a laser beam lower than that of the light-absorbable member 102 and is composed mainly of a thermoplastic resin or a thermoplastic elastomer, which may be formed by injection molding or the like. It is preferable to have an absorption rate to a laser beam selected from laser beams having a center of oscillation wavelength within a range of 193-10600 nm lower than that of the light-absorbable member 102.

As the thermoplastic resin constituting the light-permeable member 106 are included, for example, polyamide resin, polyethylene resin, polypropylene resin, polyethylene terephthalate resin, polybutylene terephthalate resin, polyphenyl ether resin, polystyrene resin, high-impact polystyrene resin, hydrogenated polystyrene resin, polyacryl styrene resin, ABS resin, AS resin, AES resin, ASA resin, SMA resin, polyalkyl methacrylate resin, polymethyl methacrylate resin, polycarbonate resin, polyester resin, polyphenylene sulfide, liquid crystal polymer and so on. As the thermoplastic elastomer are included, for example, styrene-based thermoplastic elastomer, olefinic thermoplastic elastomer, polyester-based thermoplastic elastomer, polyurethane-based thermoplastic elastomer, PVC-based thermoplastic elastomer and so on. Moreover, the thermoplastic resin may be kneaded with glass fibers, minerals and the like as a reinforcing material. Further, the thermoplastic resin or thermoplastic elastomer may be kneaded, for example, with a white pigment or a chromatic coloring agent of yellow, green, red or the like as long as it has an absorption rate lower than that of the light-absorbable member.

In the joint structure 100, second dot-like weld parts 114 joining the light-absorbable member 102 and the light-permeable member 106 are disposed in position adjacent to the first annular weld part 104 as shown in FIG. 1A. The second weld part 114 is formed by irradiating a laser beam from the side of the light-permeable member 106 toward the light-absorbable member 102. It is important to form the second weld part 114 before the formation of the first weld part 104. Because the second weld part 114 can correct warping due to the shaping of the light-permeable member or suppress thermal deformation of the light-permeable member in the subsequent formation of the annular weld part producing a large thermal influence.

The joining strength between the light-absorbable member 102 and the light-permeable member 106 can be increased even more by forming the second weld part 114 in addition to the first weld part 104.

The second weld part 114 is preferable to be formed adjoining to a corner part when the light-permeable member 106 is substantially rectangular. Because the second weld part 114 can suppress thermal deformation of the light-permeable member 106 effectively in the formation of the first weld part 104.

In the joint structure 100, the light-permeable member 106 is formed into a thin sheet adhering at its peripheral edge portion to an upper end face of the peripheral wall 108 of the light-absorbable member 102 by deforming when an interior of the opening portion O is depressurized before the formation of the first weld part 104. Thus, when the light-permeable member 106 is superposed with the light-absorbable member 102, even if a gap is produced between the upper end face of the peripheral wall 108 of the light-absorbable member 102 and the light-permeable member 106, the interior of the opening portion O can be depressurized through the suction port 112 to adhere the light-permeable member 106 to the upper end face of the peripheral wall 108 of the light-absorbable member 102, whereby an excellent adhesiveness by suction can be obtained between the mutual light-permeable member 106 and light-absorbable member 102 while preventing vacuum breakage due to air leakage together with an effect of suppressing the deformation of the light-permeable member 106 by the second weld part 114.

In order to more surely establish the above, it is preferable that the light-permeable member 106 is deformed when the interior of the opening portion O is depressurized to not less than −80 kPa but not more than −20 kPa as a gauge pressure before the formation of the first weld part 104 so as to have a thickness for the development of an easy deformability adhering to the light-absorbable member 102. In order to ensure the adhesiveness by sufficient deformation, the thickness of the light-permeable member 106 is preferably 0.005 mm-0.2 mm, more preferably 0.01 mm-0.1 mm considering the formability.

In order that the light-permeable member 106 is adhered to the light-absorbable member 102 by deforming when the interior of the opening portion O is depressurized to not less than −80 kPa but not more than −20 kPa as a gauge pressure before the formation of the first weld part 104, it is preferable to select or use a material having a tensile elastic coefficient (Young's modulus) of 0.01-18 GPa. When the tensile elastic coefficient (Young's modulus) of the light-permeable member 106 exceeds 18 GPa, it is necessary to make the thickness very thinner for easily deforming in the depressurization of the opening portion O and hence it is difficult to shape the member as designed. For example, when the light-permeable member 106 is formed by injection molding, a resin is not flown into a thinned portion, which is a cause of poor formation. On the other hand, when the tensile elastic coefficient (Young's modulus) of the light-permeable member 106 is less than 0.01 GPa, the rigidity of the material itself becomes lower, and hence it is difficult to keep the shape of the member itself and it is difficult to place the member of the target shape in a target position. In order to balance the easy deformability, formability and positioning property of the light-permeable member 106 in a high dimension, it is preferable to select or control the tensile elastic coefficient (Young's modulus) of the material for the light-permeable member 106 within a range of 6-10 GPa. The tensile elastic coefficient (Young's modulus) can be measured by placing a test specimen as described in JIS K7162 in a tension testing machine, drawing a stress-strain curve from stress and strain (deformation quantity) according to a definition of JIS K7161 and determining a gradient from the curve. In this case, if the stress-strain curve is not linear and it is difficult to determine the gradient therefrom, a secant modulus (a gradient of a straight line connecting a point of the stress-strain curve to an original point) or the like can be used instead of the Young's modulus.

In the joint structure 100, a ratio of an area S2 of a portion at the side of the light-absorbable member 102 (a portion below a boundary face F, which is called as a "second portion" hereinafter) to an are S1 of a portion at the side of the light-permeable member 106 (a portion above a boundary face F, which is called as a "first portion" hereinafter) in the first weld part 104 is within a range of 12-35 viewing a section perpendicular to the extending direction of the first weld part 104 as shown by an enlarged view in FIG. 1B. When the ratio is less than 12, there is a fear of causing a separation starting a boundary to the weld part 104 when a force peeling the light-permeable member 106 from the light-absorbable member 102 is applied (boundary separation) or a separation of at least a part of a portion of the weld part 104 at the side of the light-absorbable member 102 at a state of integrally uniting to the light-permeable member 106. Also, this separation is difficult to be inspected non-destructively in an industrial production. When the ratio of area S2 to area S1 is not less than 12, the separation is hardly caused in the weld part 104, and the light-permeable member 106 or the light-absorbable member 102 itself is broken when a force peeling the light-permeable member 106 from the light-absorbable member 102 is applied (member breakage), so that it is enough to control strengths of the members 102 and 106 when the welding strength is designed or set and hence the structure can be manufactured stably. On the other hand, when the ratio exceeds 35, it is necessary to increase a power or prolong an irradiation time for arriving the laser beam at a deeper position of the light-absorbable member 102, and hence there is a fear of exposing thermal influence to the light-permeable member 106 (upheaving, bubbling, melting on the surface, carbonization due to burning, discoloring) or thermal influence to the light-absorbable member 102 (carbonization due to burning, bubbling). In order to realize the avoidance of these thermal influences and the suppression and prevention of the separation in the weld part 104 in a high dimension, the ratio of S2 to S1 is preferable to be a range of 19-26.

When the ratio of the area S2 of the portion at the side of the light-permeable member to the area S1 of the portion at the side of the light-absorbable member in the first weld part 104 is made to the above range, the thermal influence to the light-permeable member associated with the formation of the first weld part 104 can be made small to suppress thermal strain of the light-permeable member 106 while ensuring the joining strength, and hence the more excellent adhesiveness between the light-permeable member 106 and the light-absorbable member 102 by suction can be obtained together with the adhesion effect by the easy deformation of the thin sheet-like light-permeable member 106.

Moreover, the first weld part 104 having the above ratio of area S2 to area S1 can be formed by the method of manufacturing the joint structure as mentioned later with reference to FIGS. 8A-8D. In the measurement of the areas S1 and S2, the range (boundary) of the first weld part 104 can be judged by cutting the joint structure 100 in a direction perpendicular to the extending direction of the first weld part 104 to prepare a test specimen and observing a section thereof with an optical microscope or an electron microscope or confirming a tomographic image thereof with an X-ray CT.

When the light-permeable member 106 is produced by injection molding, convex warping toward the lower face side or toward the upper face side of the light-permeable member 106 may be generated resulting from the position of the gate, flowing of the molten resin, non-uniform cooling after the take-out from a mold and the like. The convex warping toward the lower face side is unfavorable because a gap is caused between the peripheral edge portion of the light-permeable member 106 and the upper end face of the peripheral wall 108 of the light-absorbable member 102 when the light-permeable member 106 is superposed on the light-absorbable member 102. In this embodiment, therefore, a concave portion 116 having a reduced thickness is formed in the lower face of the light-permeable member 106 (face at the side of the light-absorbable member 102) over not less than 50% of the inner region of the first weld part 104, whereby the warping direction is induced into a direction of forming convex toward the upper face side. When the forming region of the concave portion 116 is less than 50% of the inner region of the first weld part 104, there is a fear that a force enough to induce warping of the light-permeable member 106 as a whole with respect to shrinking of the resin material causing the warping. In order to prevent the warping quantity from excessively increasing, it is preferable to make the depth of the concave portion 116 to not more than 50% of the thickness. If the depth of the concave portion 116 exceeds 50% of the thickness, the rigidity of the light-permeable member 106 is decreased to cause torsion as to the shrink of the resin material causing the warping, so that a gap is generated between the light-permeable member 106 and the light-absorbable member 102 in the adhesion by suction to make adhesiveness poor and hence there is a fear of causing position shift or poor welding (excessive temperature rise or unmelting due to non-transfer of heat).

Another embodiment of the joint structure 200 according to the invention will be described with reference to FIGS. 2A, 2B and 2C. The joint structure 200 is different from the joint structure 100 in a point that plural opening portions O are formed in the light-absorbable member 202.

The light-absorbable member 202 is provided with a peripheral wall 208, a bottom wall 210 closing a lower end part of the peripheral wall 208, and a top wall 218 communicating to an upper end part of the peripheral wall 208, and plural slits 220 extending in the same direction are formed in the top wall 218 to define opening portions O. The top wall 218 can prevent a light-permeable member 206 or weld parts 204, 214 from breaking for controlling flexural deformation of the light-permeable member 206 when shock or load is applied to the upper face of the light-permeable member 206 from exterior. Since the top wall 218 acts as a beam, it can reinforce the peripheral wall 208 of the light-absorbable member 202.

A concave portion 216 of the light-permeable member 206 has an effect of controlling the warping direction and quantity of the light-permeable member 206 as mentioned above. In addition to this, a gap is kept between the light-permeable member 206 and the top wall 218. As a result, when the opening portion O is depressurized, the light-permeable member 206 can be contacted with the top wall 218 to prevent the decrease of an area receiving a negative pressure. If the area receiving the negative pressure is decreased, the light-permeable member cannot be deformed sufficiently under a vacuum pressure, and there is a fear of damaging an adhesiveness between the light-permeable member 206 and the light-absorbable member 202 by suction. From a viewpoint of this prevention, the forming region of the concave portion 216 constituting the light-permeable member 206 is preferable to be not less than 50% of an interior region of the annular weld part 204.

Even in the joint structure 200, a ratio of an area S2 of a portion at the side of the light-absorbable member 202 to an area S1 of a portion at the side of the light-permeable member 206 in the annular weld part 204 viewing a section perpendicular to an extending direction thereof is within a range of 12-35, preferably 19-26 similarly in the aforementioned joint structure 100.

The other embodiment of the joint structure 300 according to the invention will be described with reference to FIGS. 3A, 3B, and 3C. The joint structure 300 is provided with a light-permeable member 306 and a light-absorbable member 302. The light-absorbable member 302 has a peripheral wall 308, a bottom wall 310 closing a lower end part of the peripheral wall 308, and a top wall 318 communicating to an upper end part of the peripheral wall 308. Plural slits 320 extending in the same direction are formed in the top wall 318 to define opening portions O. The joint structure 300 is different from the joint structures 100 and 200 in a point that a thinned piece 324 adhering to an upper face end of a peripheral wall 308 of a light-absorbable member 302 is formed by deforming a light-permeable member 306 at a position outside a first weld part 304 before the formation of the first weld part 304 when an interior of an opening portion O is at a depressurized state. Thus, even when a gap is caused between the the upper end face of the peripheral wall 308 of the light-absorbable member 302 and the light-permeable member 306 in the superposition between the light-permeable member 306 and the light-absorbable member 302, the thinned piece 324 of the light-permeable member 306 can be drawn and adhered to the upper end face of the peripheral wall 308 of the light-absorbable member 302 when the interior of the opening portion O is depressurized through a suction port 312, so that vacuum breakage due to air leakage can be prevented and also an excellent adhesiveness between the light-permeable member 306 and the light-absorbable member 302 by suction can be obtained.

To this end, the thinned piece 324 is preferable to be formed in a thickness developing the easy deformability for adhering to the light-absorbable member 302 by deforming when the interior of the opening portion O is depressurized to not less than −80 kPa but not more than −20 kPa as a gauge pressure before the formation of the first weld part 304. In order to ensure the adhesiveness by sufficient deformation, the thickness of the thinned piece is preferably 0.005 mm-0.2 mm, more preferably 0.01 mm-0.1 mm in view of the formability.

Figure 3A:
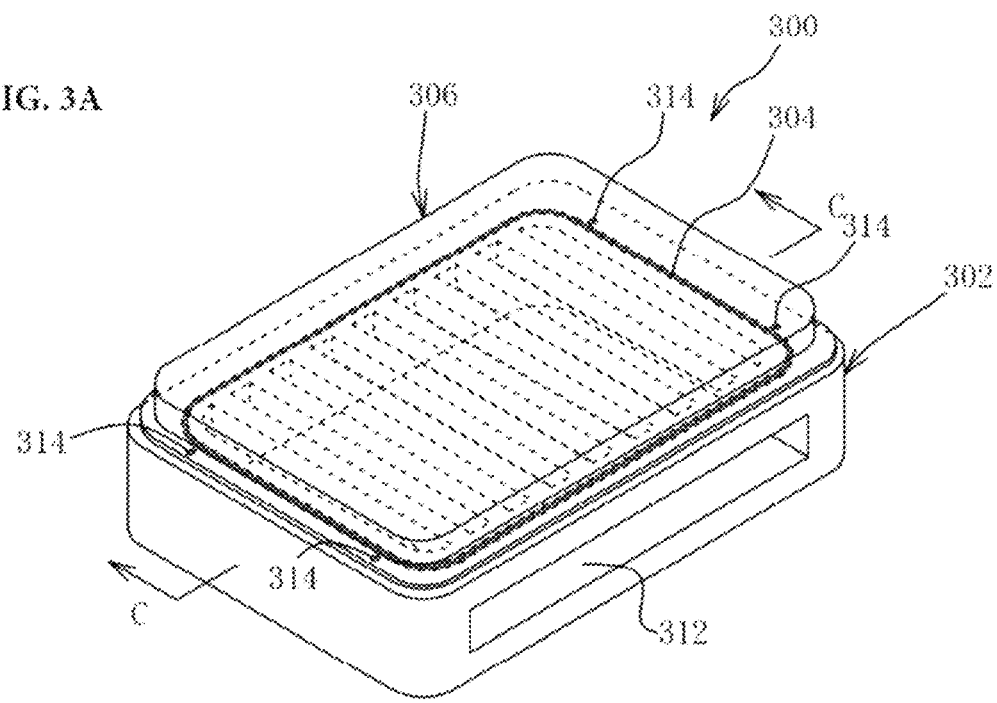
FIG. 3A is a perspective view of the other embodiment of the joint structure according to the invention and FIG. 3B is a section view taken along a line C-C in FIG. 3A.
Figure 3B:
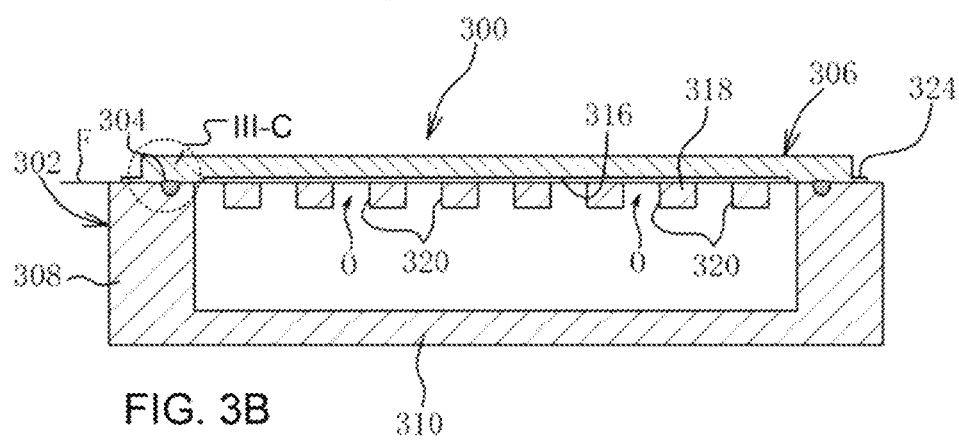
Figure 3C:
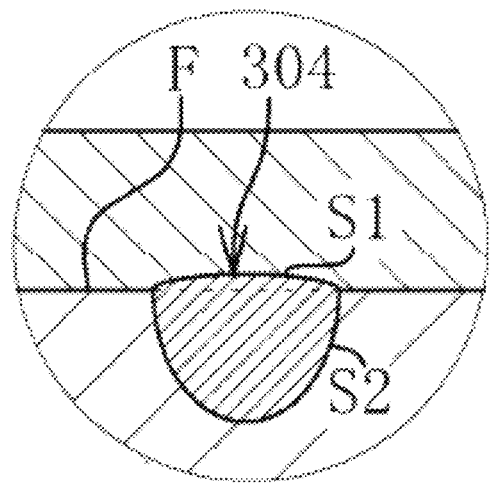
FIG. 3C is enlarged view of region III-C in FIG. 3B.
Figure 4A:
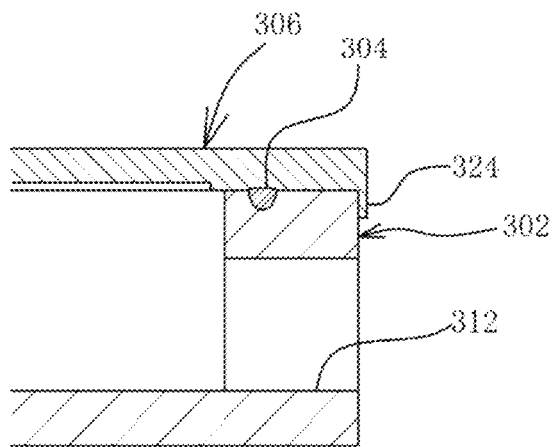
FIGS. 4A and 4B are section views of modification examples of a thinned piece in the joint structure shown in FIGS. 3A and 3B, respectively.
Figure 4B:
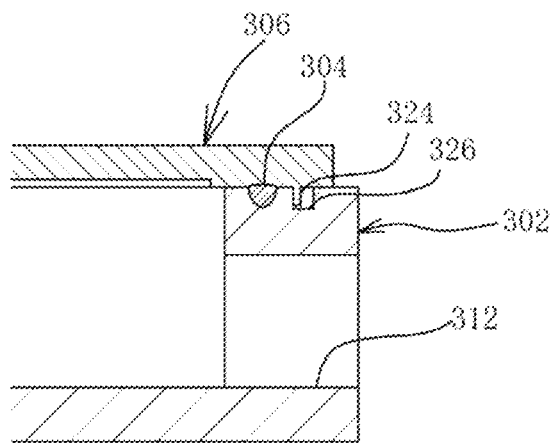

In the example of FIGS. 3A 3B, and 3C, the thinned piece 324 is formed in a horizontal direction from the lower end of the peripheral portion of the light-permeable member 306 along the upper end face of the peripheral wall 308 of the light-absorbable member 302. Alternatively, it may be hanged down from the lower end of the peripheral portion of the light-permeable member 306 along the outer face of the peripheral wall 308 as shown in FIG. 4A or an annular groove 326 is formed in the upper end face of the peripheral wall 308 of the light-absorbable member 302 and the thinned piece 324 may be hanged down from the lower face of the light-permeable member 306 so as to insert into the annular groove 326 as shown in FIG. 4B.

Even in the joint structure 300, the annular weld part 304 is preferable to have a ratio of an area S2 of a portion at the side of the light-absorbable member 302 to an area S1 of a portion at the side of the light-permeable member 306 viewing a section perpendicular to the extending direction thereof within a range of 12-35, more preferably 19-26 similarly in the joint structures 100 and 200.

Next, the method of manufacturing the joint structure according to the invention will be described with reference to FIGS. 5A, 5B, 6A, 6B, 7, 8A-8D, and 9A-9C. Here, the method of manufacturing the joint structure 100 shown in FIGS. 1A, 1B, and 1C are described as an example. This manufacturing method can be applied to the manufacture of the joint structures 200 and 300 shown in FIGS. 2A, 2B, 3A, 3B, 4A and 4B.

The first step is a step of providing members. A light-absorbable member 102 and a light-permeable member 106 are provided in this step. The material and basic structure of each of the light-absorbable member 102 and the light-permeable member 106 in the joint structure 100 are previously described with reference to FIGS. 1A, 1B, and 1C, so that their overlapping explanations are omitted here.

Figure 5A:
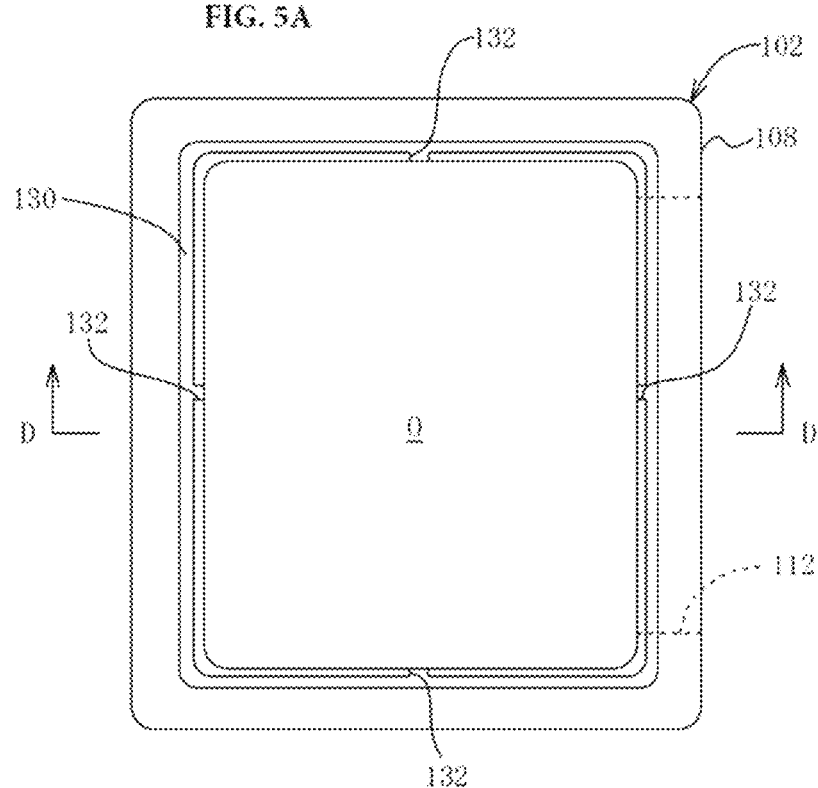
FIG. 5A is a plane view of a light-absorbable member used in the method of manufacturing an embodiment of the joint structure according to the invention and FIG. 5B is a section view taken along a line D-D shown in FIG. 5A.
Figure 5B:
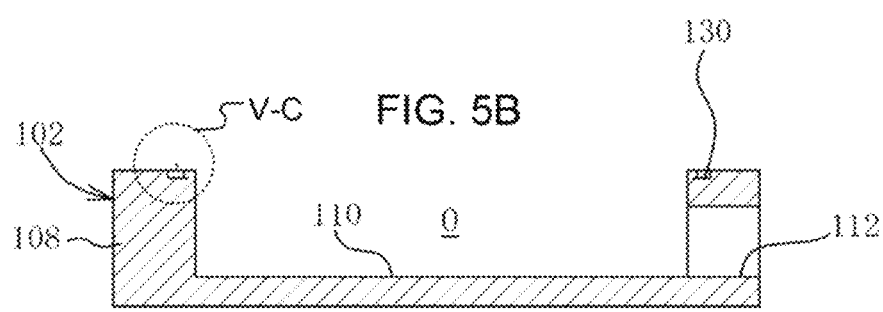
Figure 5C:
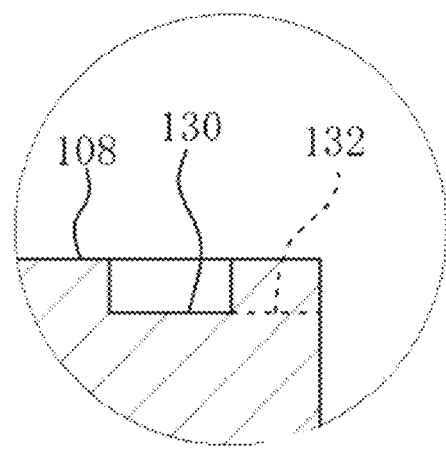
FIG. 5C is enlarged view of region V-C in FIG. 5B.

FIGS. 5A, 5B and 5C show the light-absorbable member 102 before the joining to the light-permeable member 106, wherein FIG. 5A is a plane view, FIG. 5B is a section view taken along a line D-D of FIG. 5A, and FIG. 5C is enlarged view of region V-C in FIG. 5B. As shown in this figure, an annular groove 130 is previously formed in an upper end face of a peripheral wall 108 of the light-absorbable member 102 (face contacting to the light-permeable member 106) and at a predetermined site of forming a first weld part 104. The width of the annular groove 130 is preferable to be made larger than a diameter of a laser beam to be irradiated and is 0.1-3 mm. When the width of the annular groove 130 is less than 0.1 mm, a width of the first weld part 104 to be formed therein cannot be ensured sufficiently, and hence there is a fear that the welding strength is decreased and an airtightness or the like cannot be maintained due to the penetration of air, water and dust by exterior force or change of pressure. When the width of the annular groove 130 exceeds 3 mm, there is a fear that a portion other than the first weld part 104 is thermally influenced and deformed by heat in the welding or an excessive strain is retained by heat shrinkage in the solidification of the first weld part 104 to cause deformation. Also, the depth of the annular groove 130 (distance from a boundary face F to a groove bottom) is preferable to be not less than L/20 (mm) but not more than L (mm) when L is the width (mm) of the annular groove 130. Thus, as mentioned later with reference to FIGS. 8A-8D, a laser beam can be irradiated to the annular groove 130 to sufficiently expand a molten pool generated in the groove bottom, while heat generated therein can be well transferred to the light-permeable member 106 to thereby form a good weld part 104. Moreover, the depth of the annular groove 130 is preferable to be not less than L/10 (mm) but not more than L/3 (mm) in view of ensuring the strength and airtightness of the weld part 104. For example, the annular groove 130 have a width L of 0.3 mm and a depth of 0.05 (=L/6) mm. If the depth of the annular groove 130 is less than L/20 (mm), the expanded molten pool contacts with the light-permeable member 106 just after the irradiation of the laser beam to the bottom of the annular groove 130, while heat is dispersed, so that the molten pool cannot be widened in a lateral direction sufficiently and hence there is a fear that the welding becomes poor (a part of the annular groove 130 is left). If the depth of the annular groove 130 exceeds L (mm), the molten pool generated in the bottom cannot arrive at the light-permeable member 106 though it is expanded, and hence there is a fear that carbonization due to burning or discoloration is caused to bring about the poor welding. In the illustrated example, the sectional shape of the annular groove 130 is rectangular, but may be semi-circular or semi-ellipsoidal. Furthermore, at least one communication groove 132 communicating the annular groove 130 to an interior of an opening portion O (4 grooves per each side in the illustrated example) are previously formed in the upper end face of the peripheral wall 108.

Figure 6A:
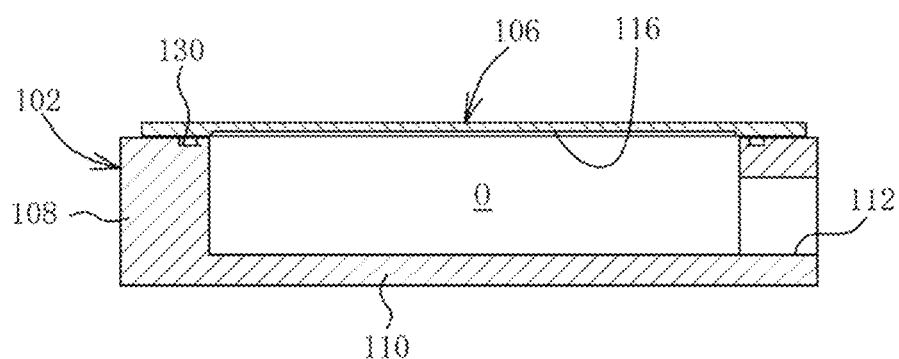
FIG. 6A is a schematic view of a layout showing the method of manufacturing an embodiment of the joint structure according to the invention and FIG. 6B is a section view showing a suction adhering step thereof.
Figure 6B:
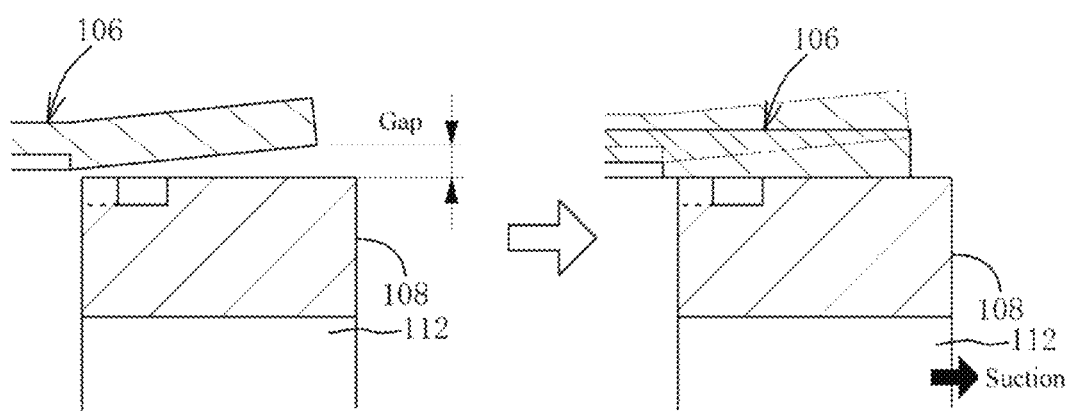

The second step is a step of arranging the light-permeable member 106 on the light-absorbable member 102 so as to cover the opening portion O as shown in FIG. 6A.

The third step is a step of adhering the superposed light-absorbable member 102 and light-permeable member 106 to each other by suction, wherein the adhesion by suction is performed by depressurizing the interior of the opening portion O. As a state after the superposition of the light-permeable member 106 and the light-absorbable member 102 is shown in a left of FIG. 6B, a gap may be formed between the light-permeable member 106 and the light-absorbable member 102 due to warping in the formation of the light-permeable member 106 or the like. However, since the light-permeable member 106 is formed into a thine sheet, when the interior of the opening portion O is depressurized, the peripheral edge portion of the light-permeable member 106 can be deformed so as to direct to the upper end face of the peripheral wall 108 and adhered thereto as shown in a right of FIG. 6B.

Figure 7:
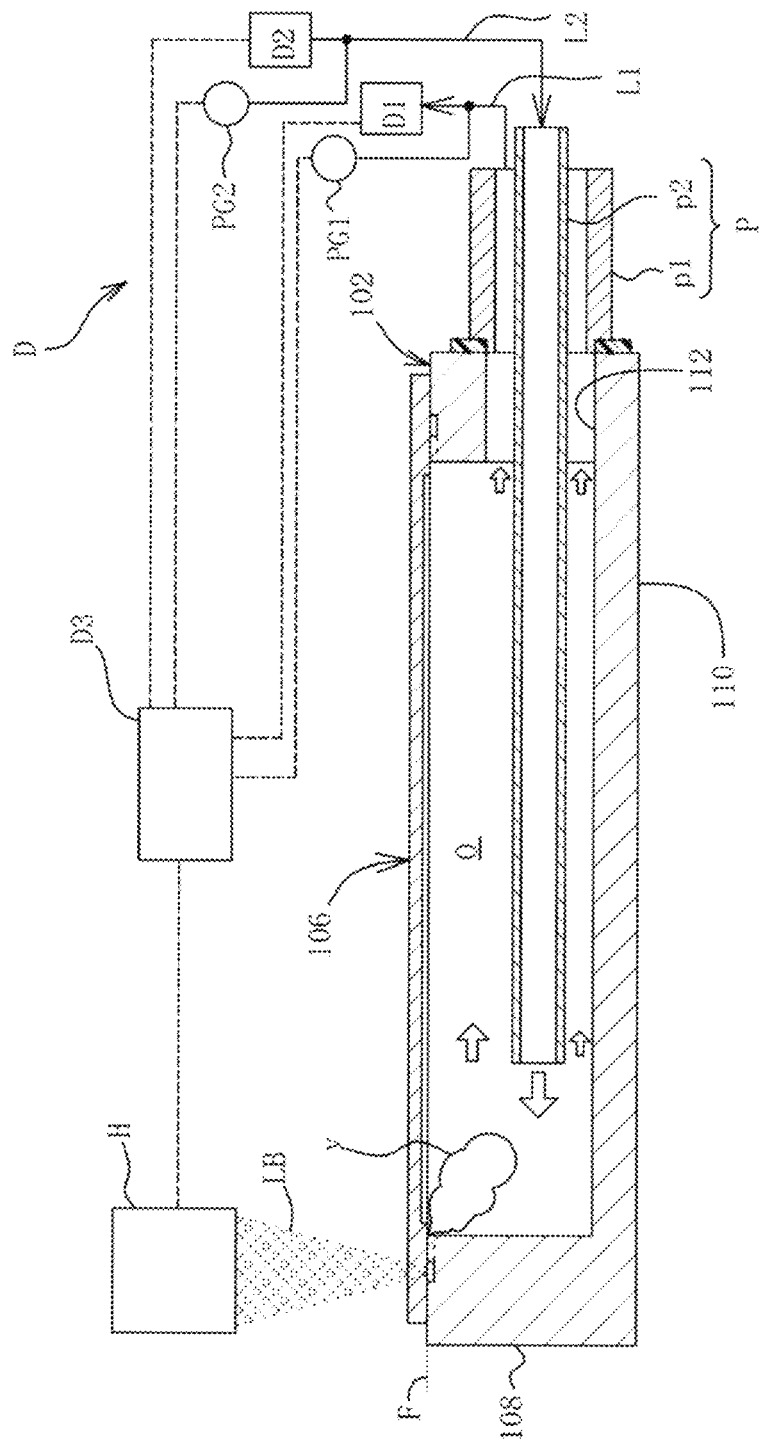
FIG. 7 is a schematic view illustrating a pressure control device and a laser beam irradiating device used in the method of manufacturing an embodiment of the joint structure according to the invention.

The depressurization in the interior of the opening portion O can be performed with an external pressure-controlling device D as shown in FIG. 7 and through a suction port 112 previously formed in the light-absorbable member 102.

The pressure-controlling device D is comprised mainly of a depressurization device D1, a pressurization device D2, a controller D3 and a double pipe P connected to the suction port 112.

The depressurization device D1 comprises a vacuum pump for discharging air inside the opening portion O by suction and an electric leak valve (not shown). In a suction line L1 of the depressurization device D1 is disposed a pressure sensor PG1, whereby a pressure inside the opening portion O can be detected during the depressurization.

The pressurization device D2 comprises a pressurized tank and a feed valve for feeding a purge gas of air or an inert gas such as nitrogen, argon or the like (not shown). In a feed line L2 of the pressurization device D2 is disposed a pressure sensor PG2, whereby a pressure inside the opening portion O can be detected during the pressurization.

The controller D3 is constructed by PLC (programmable logic controller), a personal computer or the like, which adjusts an opening degree of the feed valve and the leak valve. Also, the controller 3 is connected to the pressure sensors PG1 and PG2, and the feed valve and leak valve can be controlled based on signals detected by the pressure sensors PG1 and PG2.

The double pipe P is comprised of a suction pipe p1 arranged outside and a feed pipe p2 arranged inside. The suction pipe p1 is communicated with the interior of the opening portion O and the depressurization device D1 to suck air from the interior of the opening portion O. The feed pipe p2 is communicated with the interior of the opening portion O and the pressurization device D2 to feed a purge gas to the interior of the opening portion O. Moreover, an outer pipe of the double pipe P may be the feed pipe and an inner pipe thereof may be the suction pipe.

As shown in FIG. 7, the fourth step is a joining step wherein a laser beam LB is irradiated from the side of the light-permeable member 106 toward the upper end face of the peripheral wall 108 of the light-absorbable member 102 at a state of adhering the light-absorbable member 102 and the light-permeable member 106 by suction to form a first weld part 104 and second weld parts 114 in the boundary face F between the light-absorbable member 102 and the light-permeable member 106 or in the vicinity thereof (see FIGS. 1A, 1B, and 1C) to thereby join the light-absorbable member 102 and the light-permeable member 106 to each other.

Even in this joining step, the interior of the opening portion O is maintained at a depressurized state, but it is preferable to feed a purge gas to the interior of the opening portion O through the feed pipe p2 at least during the formation of the first weld part 104. In this case, air flow can be generated inside the opening portion O, whereby soot generated in the welding or vaporization ingredient of a flame retardant can be discharged and removed efficiently through the suction pipe p1 toward exterior.

In the formation of the weld parts 104 and 114, the second weld parts 114 are first formed and thereafter the first weld part 104 is formed. Because, the light-permeable member 106 is temporarily joined to the light-absorbable member 102 through the second weld parts 114 being relatively small in the thermal load to the light-permeable member 106 and then thermal deformation of the light-permeable member 106 is suppressed in the formation of the first weld part 104 being relatively large in the thermal load to prevent vacuum breakage due to air leakage resulted from this thermal deformation. Since the pressure receiving area to vacuum is decreased with the advance of the formation of the first weld part 104, it is preferable to arrange three or more second weld parts 114 on a plane for supplementing the decreased quantity of the pressure. In this example, four second weld parts are formed in the corner portion of the light-permeable member 106.

The second weld parts 114 are formed by irradiating a laser beam LB to the upper end face of the peripheral wall 108 of the light-absorbable member 102 at a state of stopping an optical head H (FIG. 7) above the light-permeable member 106. The second weld part 114 is preferable to have a diameter of about 0.3-0.7 mm, more preferably about 0.5 mm. The first weld part 104 is formed by irradiating a laser beam LB to the upper end face of the peripheral wall 108 while moving the optical head H along the peripheral wall 108 of the light-absorbable member 102 above the light-permeable member 106. The width of the first weld part 104 is preferably about 0.3-0.7 mm, more preferably about 0.5 mm. As an oscillator of the laser beam LB can be used, for example, a fiber laser (wavelength: 1070 nm), a YAG laser (wavelength: 1064 nm), a semiconductor laser (wavelength: 808 nm, 840 nm or 940 nm), a $CO_2$ laser (wavelength: 10600 nm) and so on.

A process of forming the first weld part 104 in which a ratio of an area of the second portion S2 to an area of the first portion S1 in FIGS. 1A, 1B, and 1C are set to 12-35 by irradiating a laser beam LB to the annular groove 130 previously formed in the upper end face of the peripheral wall 108 of the light-absorbable member 102 will be described with reference to FIGS. 8A-8D.

Figure 8A:
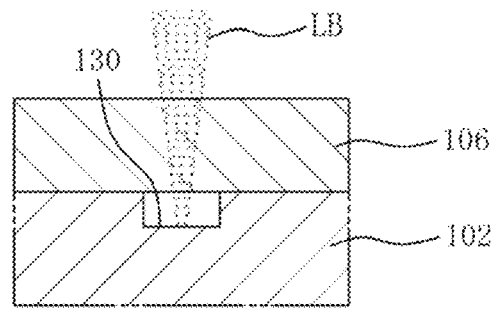
FIGS. 8A-8D are section views illustrating the sequence of forming an annular weld part by irradiating a laser beam to an annular groove of a light-absorbable member in the method of manufacturing an embodiment of the joint structure according to the invention, respectively.
Figure 8B:
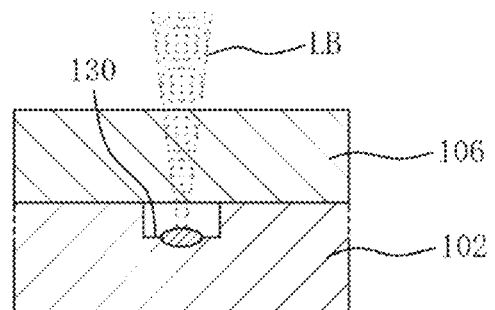
Figure 8C:
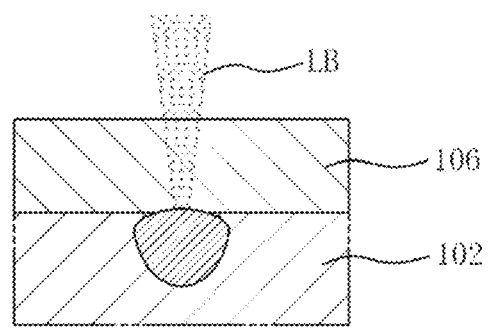
Figure 8D:
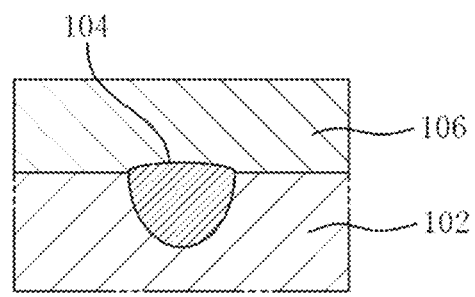

When a laser beam is irradiated from the side of the light-permeable member 106 toward the bottom of the annular groove 130 at a state of adhering the light-absorbable member 102 and the light-permeable member 106 to each other by suction as shown in FIG. 8A, the bottom of the annular groove 130 is melted by heat generation to start bubbling in a molten pool as shown in FIG. 8B. By continuously irradiating the laser beam is grown bubbles to grow the molten pool as shown in FIG. 8C. In this case, the molten pool of the light-absorbable member 102 is not contacted with the light-permeable member 106 due to the presence of the annular groove 130, so that the molten pool can be grown till sufficient width and depth are obtained. In FIG. 8D is shown a state that the irradiation of the laser beam is stopped to complete the formation of the annular weld part 104 after the arrival of the molten pool at the light-permeable member 106.

In this example, a communication groove 132 communicating the annular groove 130 to the opening portion O is disposed in the upper end face of the peripheral wall 108 of the light-absorbable member 102, so that soot generated in the process of forming the annular weld part 104 and vaporization ingredient v of a flame retardant are sucked and discharged into the opening portion O through the annular groove 130 and the communication groove 132 and finally discharged to exterior through the suction pipe p1.

The fifth step is a step of inspecting an airtightness by conducting an airtight test of the first weld part 104 in which a pressure change per unit time is measured by keeping the depressurized state inside the opening portion O or pressurizing the interior of the opening portion O or alternately performing the depressurization and the pressurization. The pressure inside the opening portion O is measured by the pressure sensors PG1 and PG2 shown in FIG. 7, and the pressure change per unit time is calculated in the controller D3 and can be output to or displayed in exterior. Alternatively, the airtight test of the first weld part 104 can be performed by arranging a flow rate sensor (not shown) in the suction line L1 or the feed line L2 to measure a change of a flow rate per unit time.

The sixth step (not shown) is a step of closing the suction port 112 by irradiating a laser beam LB from the side of the light-permeable member 106 to the interior of the suction port 112 or surrounding thereof while keeping the depressurized state inside the opening portion O after the formation of the annular weld part 104. Thus, the interior of the opening portion O can be closed while keeping vacuum inside the opening portion O. Of course, the suction port 112 may be at an opened state.

According to the method of manufacturing the joint structure according to the invention, the opening portion O is formed in the light-absorbable member 102, and the light-absorbable member 102 is adhered to the light-permeable member 106 by suction by depressurizing the interior of the opening portion O, so that the use of the glass plate for adhering both the members 102 and 106 to each other under a pressure is useless and the aforementioned various problems resulted from the use of the glass plate can be solved.

Since the light-permeable member 106 is temporarily joined to the light-absorbable member 102 by forming the second weld parts 114 prior to the formation of the first weld part 104, warping resulted from the shaping of the light-permeable member 106 can be corrected and also thermal deformation of the light-permeable member 106 can be suppressed on the way of forming the first weld part 104, so that the decrease of the adhesiveness by suction due to these warping and thermal deformation can be prevented.

Further, the light-permeable member 106 can be deformed easily by depressurizing the interior of the opening portion O, so that even if the gap is generated between the light-permeable member 106 and the light-absorbable member 102 in the superposition, the gap can be closed with the light-permeable member 106 by depressurizing the interior of the opening portion O and the excellent adhesiveness by suction can be obtained.

Since the annular groove 130 is formed on the upper end face of the peripheral wall 108 of the light-absorbable member 102 and the first weld part 104 is formed by irradiating a laser beam LB to the annular groove 130, a high joining strength can be obtained by the formation of weld part 104 having sufficient width and depth, and also thermal influence upon the light-permeable member 106 can be made small to suppress thermal deformation of the light-permeable member 106 in the welding process and the decrease of adhesiveness by suction due to the thermal deformation can be prevented.

Since the communication groove 132 communicating the annular groove 130 to the opening portion O is disposed in the upper end face of the peripheral wall 108 of the light-absorbable member 102, soot generated during the formation of the annular weld part 104 and vaporization ingredient v of a flame retardant can be sucked into the opening portion O through the annular groove 130 and the communication groove 132 and finally discharged to exterior through the suction pipe p1.

Since the depressurization in the opening portion O is performed while feeding the purge gas to the interior of the opening portion O, air flow can be generated in the opening portion O to discharge and remove the soot and the vaporization ingredient v efficiently.

When the airtightness test of the first weld part 104 is performed keeping the depressurized state of the opening portion O after the formation of the first weld part 104, or pressurizing the interior of the opening portion O, or alternately performing the depressurization and the pressurization to measure a change of pressure or flow rate per unit time, the manufacturing installation ca be simplified and the manufacturing time can be shortened largely.

When the pressure in the opening portion O is always detected by the pressure sensor PG1 and the adhesion between the light-absorbable member 102 and the light-permeable member 106, the start of forming the first weld part 104 and the end of forming the first weld part 104 are judged based on the pressure change detected, it is possible to shorten working time in the usual production and early handling in the abnormal state.

Figure 9A:
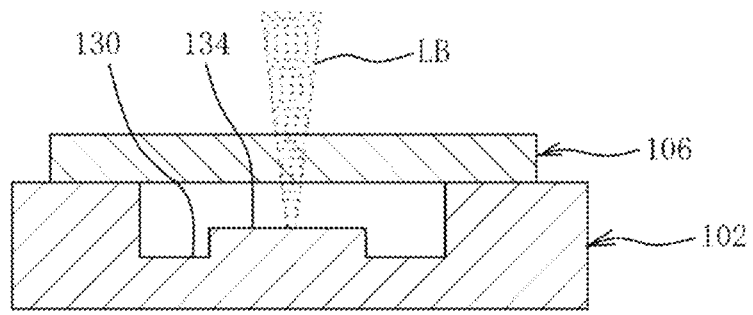
FIG. 9A-9C are a section views illustrating another examples of an annular groove applicable to the method of manufacturing the joint structure according to the invention.
Figure 9B:
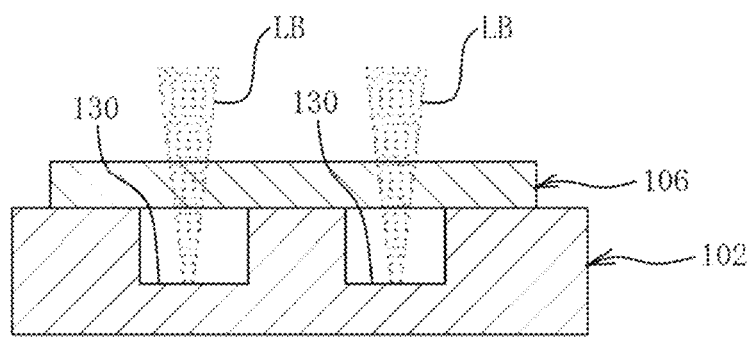
Figure 9C:
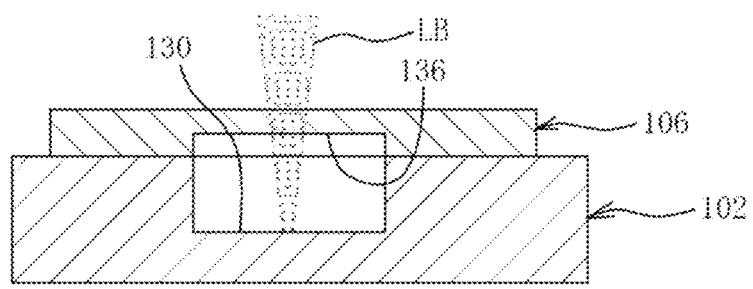

Although the above is described with reference to the illustrated examples, the invention is not limited to these examples and various modifications and additions may be performed within a scope described in claims. In the method of manufacturing the joint structure of the above embodiments, the bottom of the annular groove 130 is illustrated to be flat, but an elevated portion 134 may be provided on the groove bottom as shown in FIG. 9A. Also, the number of the annular groove 130 is not limited to one. For example, two adjoining grooves may be disposed and integrally united in the welding to form a wider weld part 104 as shown in FIG. 9B, or an annular groove 136 may be disposed at the side of the light-permeable member 106 as shown in FIG. 9C.

EXAMPLE

Example 1

Figure 10A:
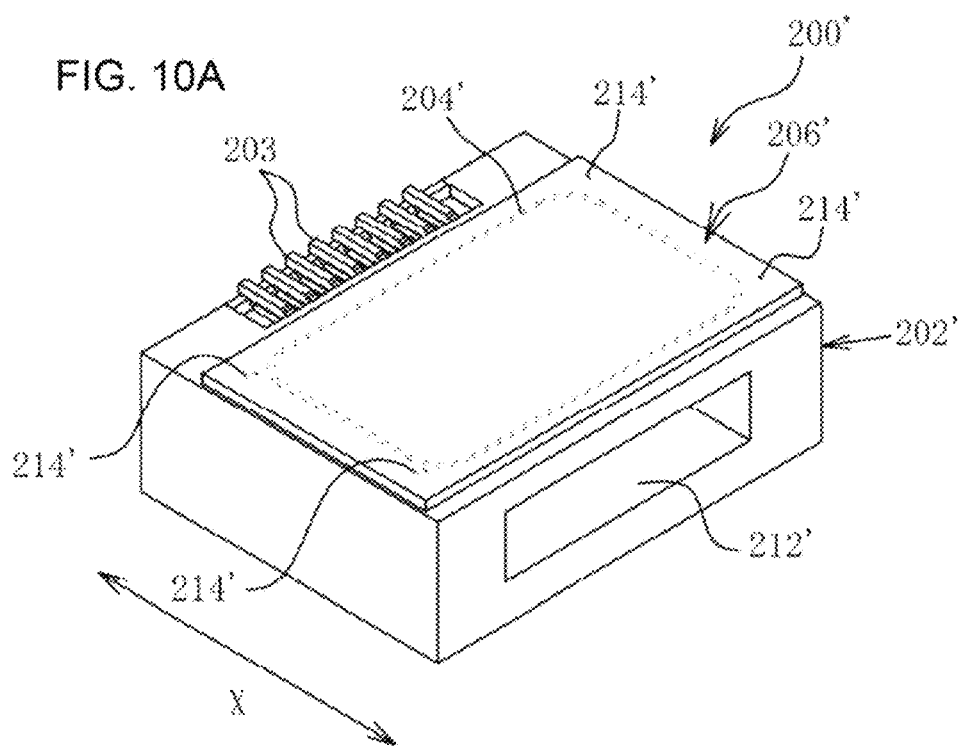
FIG. 10A is a perspective view of an embodiment of the connector according to the invention and FIG. 10B is a section view thereof.
Figure 10B:
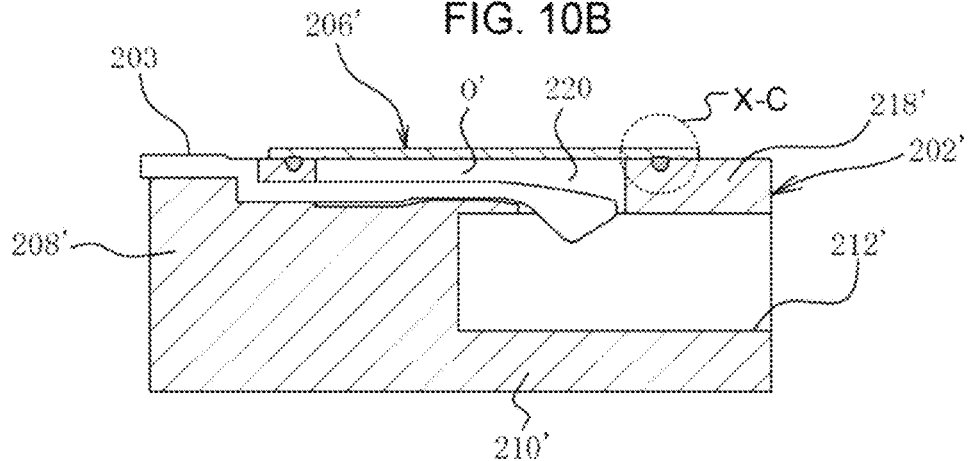
Figure 10C:
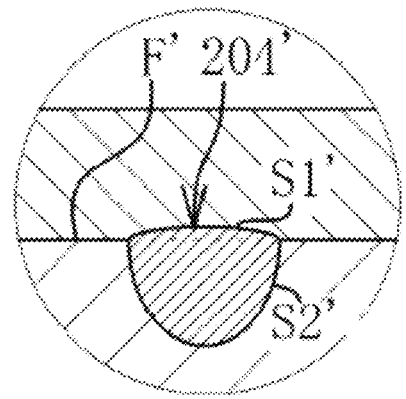
FIG. 10C is enlarged view of region X-C from FIG. 10B.

An example of applying the invention to a connector will be described. FIGS. 10A, 10B, and 10C show a connector using the joint structure 200 of FIGS. 2A, 2B and 2C, in which FIG. 2A is a perspective view, FIG. 2B is a section view along a fitting direction X, and FIG. 2C is enlarged view of region II-C in FIG. 2B. In this figure, the corresponding member or portion is represented by adding ' to the symbol, and the overlapping explanation is omitted.

This connector 200' is a receptor connector fixed to a substrate in an electronic device such as mobile device, information device or the like and connected to another connector (not shown) by inserting in a fitting direction X. This is comprised mainly of a housing 202' as a light-absorbable member 202, plural contacts 203 extended in the fitting direction X and arranged in a direction perpendicular to the fitting direction X, and a thin sheet-formed cover 206' as a light-permeable member 206 sealed so as to cover an opening portion O' of the housing 202'.

The housing 202' is made from a light-absorbable and insulating thermoplastic resin and provided with a peripheral wall 208' having a fitting port 212' for inserting the other connector, a bottom wall 210' and a top wall 218'.

In the top wall 218' of the housing 202' are formed a plurality of slits 220' along the fitting direction X, and the opening portion O' is defined by these slits 220'. In each of the slits 220' is arranged the contact 203. The forward end of the each contact 203 is protruded downward from the inner face of the top wall 218' for connecting to the other connector, while the posterior end thereof is exposed from the housing 202' for connecting to the substrate of the electronic device or the other printed circuit board.

The cover 206' is superposed to the housing 202' so as to cover the opening portion O' of the housing 202' and joined to the upper end face of the peripheral wall 208' over the whole periphery through a first annular weld part 204' formed so as to enclose the slits 220' in a bundle. Thus, a root of penetrating air, soot or water from a fitting port 212' through the slits 220' into the interior of the electronic device is blocked by the cover 206' and the first weld part 204'. Also, four dot-like second weld parts 214' are formed outside the first weld part 204' and adjacent to corner parts of the cover 206'.

In the connector 200', the annular weld part 204' has a ratio of an area S2' of a portion at the side of the housing 202' to an area S1' of a portion at the side of the cover 206' viewing from a section perpendicular to the extending direction within a range of 12-35, preferably 19-26. The symbol F' in FIG. 10B represents a boundary face between the housing 202' and the cover 206'.

The connector 200' can be manufactured by the method described with reference to FIGS. 5A, 5B, 6A, 6B, 7, and 8A-8D using the fitting port 212' as a suction port 212.

Example 2

Figure 11A:
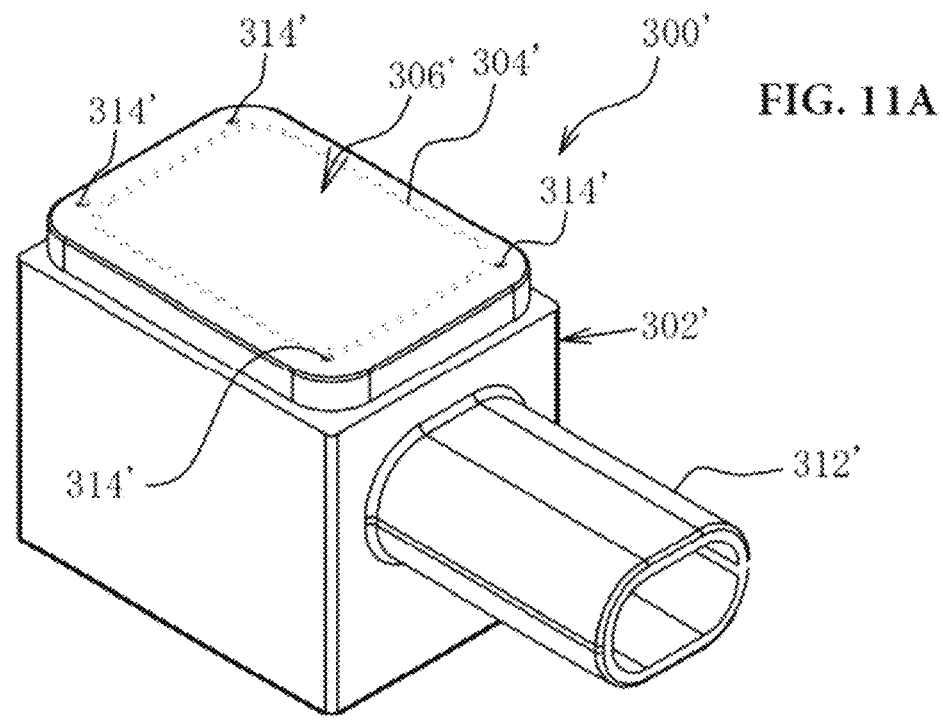
FIG. 11A is a perspective view of an embodiment of the sensor according to the invention and FIG. 11B is a section view thereof.
Figure 11B:
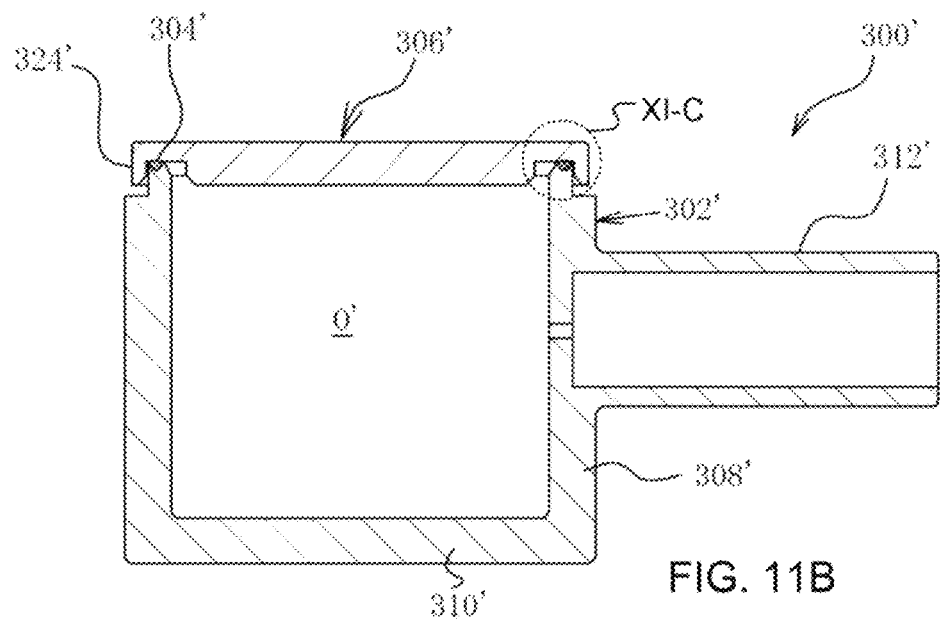
Figure 11C:
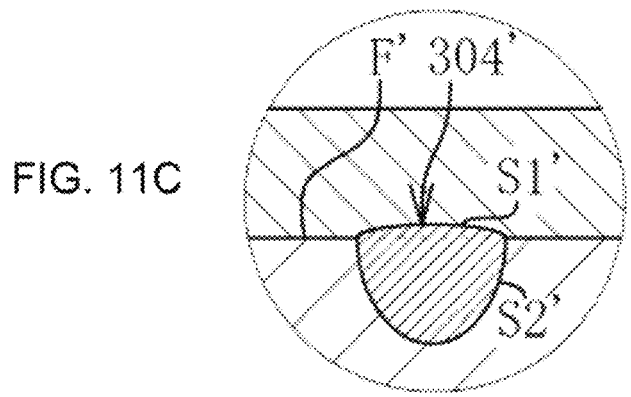
FIG. 11C is enlarged view of region XI-C from FIG. 11B.

An example of applying the invention to a sensor will be described. FIGS. 11A, 11B, and 11C show a sensor using the joint structure 300 shown in FIGS. 4A and 4B, in which FIG. 4A is a perspective view and FIG. 4B is a section view.

The sensor 300' may be all types of acceleration sensor, vibration sensor, angular velocity sensor, distance sensor, position sensor and so on. The sensor 300' is comprised mainly of a chassis 302' as a light-absorbable member 302, and a cover 306' as a light-permeable member 306 sealed so as to cover an opening portion O' of the chassis 302'. A detector body (sensor chip, not shown) is housed in the interior of the chassis 302'.

The chassis 302' is made from a light-absorbable thermoplastic resin and provided with a peripheral wall 308' defining the opening portion O' and protruding a suction cylinder 312' forward and a bottom wall 310'.

The cover 306' is placed on the peripheral wall 308' of the chassis 302' so as to cover the opening portion O' of the chassis 302' and joined thereto over the whole periphery through first annular weld part 304' and second dot-like weld parts 314'. In the peripheral edge part of the cover 306' is hanged down a thinned piece 324' along the outer face of the peripheral wall 308'. The thinned piece 324' is formed so as to draw and adhere to the peripheral wall 308' when the interior of the opening portion O' is depressurized through the suction cylinder 312'.

In the sensor 300', the annular weld part 304' has a ratio of an area S2' of a portion at the side of the chassis 302' to an area S1' of a portion at the side of the cover 306' viewing from a section perpendicular to the extending direction within a range of 12-35, preferably 19-26. The symbol F' in FIG. 11B represents a boundary face between the chassis 302' and the cover 306'.

The sensor 300' can be manufactured by the method described with reference to FIGS. 5A, 5B, 6A, 6B, 7, and 8A-8D using the suction cylinder 312' as a suction port 312.

Moreover, the base end part of the suction cylinder 312' is opened, but the opening of the base end part of the suction cylinder 312' may be closed by irradiating a laser beam to the vicinity of the opened base end part of the suction cylinder 312' from the cover 306' at a state of keeping the depressurization of the opening portion O' after the formation of the annular weld part 304'. Thus, the interior of the sensor 300' can be closed at a state of keeping vacuum.

INDUSTRIAL APPLICABILITY

According to the invention, the joint structure suitable for adhering mutual members to be joined to each other uniformly and surely is provided without using a glass plate, and also the method of manufacturing a joint structure, which is capable of adhering mutual members to be joined to each other uniformly and surely, can be provided without using a glass plate.

DESCRIPTION OF REFERENCE SYMBOLS

100, 200, 300 joint structure
102, 202, 302 light-absorbable member
104, 204, 304 annular weld part (first weld part)
106, 206, 306 light-permeable member
108, 208, 308 peripheral wall
112, 212, 312 suction port
114, 214, 314 dot-like weld part (second weld part)
324 thinned piece
D pressure control device
D1 depressurization device
D2 pressurization device
D3 controller
F boundary face
H optical head
L1 suction line
L2 feed line
O opening portion
PG1, PG2 pressure sensor
S1 area of first portion of annular weld part (at the side of light-permeable member)
S2 area of second portion of annular weld part (at the side of light-absorbable member)

What is claimed is:

1. A joint structure comprising a light-absorbable member having at least one opening portion and a light-permeable member superposed on the light-absorbable member so as to cover the opening portion,
   wherein an annular first weld part is formed so as to enclose the opening portion and join an end face of a peripheral wall surrounding the at least one opening portion of the light-absorbable member to the light-permeable member, and a dot-like second weld part(s) joining the light-absorbable member and the light-permeable member is formed in a position adjacent to the annular first weld part,
   wherein the light-permeable member has a substantially rectangular shape, and the dot-like second weld part is formed adjacent a corner of the substantially rectangular shape.

2. The joint structure according to claim 1, wherein the light-permeable member is formed into a thin sheet adhering to the light-absorbable member by deforming at a depressurized state of an interior of the opening portion before the formation of the annular first weld part.

3. The joint structure according to claim 2, wherein the light-permeable member is formed to have a thickness adhering to the light-absorbable member by deforming when the interior of the opening portion is depressurized to not less than −80 kPa but not more than −20 kPa as a gauge pressure before the formation of the annular first weld part.

4. The joint structure according to claim 1, wherein the light-permeable member is provided outside the annular first weld part with a thinned piece adhering to the light-absorbable member by deforming at a depressurized state of an interior of the opening portion before the formation of the annular first weld part.

5. The joint structure according to claim 4, wherein the thinned piece is formed in a thickness adhering to the light-absorbable member by deforming when the interior of the opening portion is depressurized to not less than −80 kPa but not more than −20 kPa as a gauge pressure before the formation of the annular first weld part.

6. The joint structure according to claim 4, wherein the thinned piece is formed along a peripheral edge part of the light-absorbable member.

* * * * *